United States Patent [19]

Goodlad et al.

[11] Patent Number: 5,480,973
[45] Date of Patent: Jan. 2, 1996

[54] GEL PRODUCTS AND A PROCESS FOR MAKING THEM

[75] Inventors: John S. Goodlad, West Bridgeford; Jonathan R. Cant, Melton Mowbray; Stephen Harford, Oakham, all of United Kingdom

[73] Assignee: Nadreph Limited, Slough, United Kingdom

[21] Appl. No.: 137,098

[22] PCT Filed: Apr. 22, 1992

[86] PCT No.: PCT/GB92/00736

§ 371 Date: Oct. 21, 1993

§ 102(e) Date: Oct. 21, 1993

[87] PCT Pub. No.: WO92/18018

PCT Pub. Date: Oct. 29, 1993

[30] Foreign Application Priority Data

Apr. 22, 1991 [GB] United Kingdom .................. 9108604

[51] Int. Cl.$^6$ ............... A23J 3/00; A23L 1/0562; A23P 1/08; C07K 1/113
[52] U.S. Cl. ............. 530/386; 426/305; 426/573; 426/657; 427/414; 530/365; 530/367; 530/411; 530/829; 530/833
[58] Field of Search .............................. 530/365, 367, 530/386, 411, 829, 833; 427/414; 426/305, 521, 573, 656, 657

[56] References Cited

U.S. PATENT DOCUMENTS

| 2,695,235 | 11/1954 | de Goede | 426/583 |
|---|---|---|---|
| 4,108,849 | 8/1978 | Thomas | 530/833 |
| 4,168,322 | 9/1979 | Buckley et al. | 426/250 |
| 4,251,562 | 2/1981 | LeGrand et al. | 426/573 |
| 4,519,945 | 5/1985 | Ottenhof | 530/833 |
| 4,675,201 | 6/1987 | Lee et al. | 426/573 |
| 4,985,260 | 1/1991 | Niaura et al. | 426/135 |
| 5,073,392 | 12/1991 | Atwell et al. | 426/243 |
| 5,126,328 | 6/1992 | Bower et al. | 514/21 |
| 5,371,194 | 12/1994 | Ferretti | 530/378 |
| 5,416,196 | 5/1995 | Kitabatake et al. | 530/366 |

FOREIGN PATENT DOCUMENTS

| 711703 | 6/1965 | Canada | 530/411 |
|---|---|---|---|
| 0029370 | 5/1981 | European Pat. Off. . | |
| 0203725 | 12/1986 | European Pat. Off. . | |
| 0459566 | 12/1991 | European Pat. Off. . | |
| 2039923 | 1/1971 | France . | |
| 2087185 | 12/1971 | France . | |
| 2627460 | 1/1977 | Germany . | |
| 448813 | 6/1936 | United Kingdom . | |
| 942109 | 11/1963 | United Kingdom . | |
| 1230531 | 5/1971 | United Kingdom . | |
| 1285568 | 8/1972 | United Kingdom . | |
| 2162411 | 2/1986 | United Kingdom . | |
| 2228662 | 9/1990 | United Kingdom . | |

OTHER PUBLICATIONS

Chemical Abstracts, Kato et al., vol. 101, 1984, 189749u: New Food Ind. 1984, 26(8)75–88.
Chemical Abstracts, Pham et al., vol. 113, 1990, 57630m: Food Chem. 1990, 37(4), 251–60.
Ed. Philips, Williams & Wedlock, Gums and Stabilizers for the Food Industry 6 (Oxford) pp. 471–478, Hill, Bishop and Scholtte: The Production of Heat Stable Gels at Low Protein Concentration by the Use of the Maillard Reaction; 1991.
J. Agric Food Chem. 1988, 36, 806–9, Kato et al., Browning and Protein Polymerization Reaction of Ovalbumin with Glucose and Lactose.
Ed. Mitchell and Ledward, Functional properties of food macromolecules (London and New York 1986) pp. 249–250, 258 and 264.
Trends in Food Science, Aug. 1991, pp. 196–201. Singh, Modification of food proteins by covalent crosslinking.
Food Science and Technology Abstracts 1978; AN–78–12–P2381 (Razanajatouo).
Journal of Food Science, vol. 53, No. 4, Jul. 1988, pp. 1091–1095, (Naofumi Kitabatake).
Hackh's Chemical Dictionary, 4th ed., published 1969 by McGraw–Hill Book Co. (N.Y.), Grant, ed., p. 575.
Kirk–Othmer Encyclopedia of Chemical Technology, 3rd ed., published 1980 by John Wiley & Sons (N.Y.), vol. 11, pp. 164, 168–171, 175, 176.

*Primary Examiner*—Jeffrey E. Russel
*Attorney, Agent, or Firm*—Curtis, Morris & Safford

[57] ABSTRACT

A proteinaceous product comprises a stable, substantially clear, thermally irreversible gel formed by the reaction product of protein and reducing sugar, preferably containing from 2 to 25% gel-forming protein by weight. Particles or pieces of edible material may be embedded in the gel, or the gel may be divided into pieces and incorporated as an ingredient in a food product, and the product can be rendered commercially sterile while remaining substantially clear. Such products can be produced by a process which comprises reacting an aqueous dispersion of a protein or proteinaceous material with a reducing sugar or source thereof in the presence of a denaturing agent (e.g. a chaotropic agent), and/or denaturing conditions (e.g. alkaline pH).

36 Claims, No Drawings

GEL PRODUCTS AND A PROCESS FOR MAKING THEM

The present invention relates to novel protein gels and related products and to a process for making them.

It is known that aqueous solutions or dispersions of so-called functional proteins or proteinaceous materials, such as blood plasma, egg albumin or whey protein, can be coagulated by heat to form opaque solid gels which are thermally irreversible. It is also known that other proteins, for example gelatine, can form clear but thermally reversible gels.

The present invention in one aspect now provides a stable, substantially clear, thermally irreversible gel formed by the reaction product of protein and reducing sugar. Furthermore, it is possible to dry a sheet of the solid gel to form a clear film, which may have a variety of applications in place of existing film materials.

Surprisingly, gels formed by this invention retain their clarity, even after substantial further best processing or other treatment to render them commercially sterile, and for this reason may be described as 'stable'.

By a "substantially clear" gel is here meant a gel which, but for the possible inclusion of extraneous heterogeneous components, is essentially transparent in that light can pass therethrough without substantial scattering or dispersion by the gel-forming protein content. The gels may be substantially colourless or coloured, depending upon the starting materials and the reaction conditions, if only by reason of a Maillard type reaction between the protein or associated aminoacids and the sugar.

It will be appreciated that, if the gel has a deep colour, it may not give the appearance of transparency to a casual observer owing to absorption of light, but yet, by the low level of scattering, be substantially clear within the meaning of this term intended here. By way of example, transmission of light at appropriate wavelengths can be used to estimate the degree of clarity or transparency of gels. This is illustrated in Example 9 below.

In accordance with another aspect of this invention, a process for producing a galled aqueous phase comprises reacting an aqueous solution or dispersion (hereinafter referred to as a 'dispersion') of a protein or proteinaceous material with a reducing sugar or source thereof in the presence of a denaturing agent and/or denaturing conditions and forming therefrom a substantially clear, thermally irreversible gel structure.

It is contemplated that any protein may be employed that is capable of solubilisation in aqueous dispersion and can be formed by heat or the lapse of time into a gel structure under the conditions of the present invention. The preferred proteins, especially where a solid gel is required, are globular proteins such as blood plasma, whey protein or egg albumin but it may be acceptable to use other proteins such as plant storage proteins (e.g. soya), casein, mycoprotein or muscle proteins. For commercial applications it is desirable to use cruder forms of protein, for example crude blood plasma, fish offal or yeast, rather than expensive purified proteins such as bovine serum albumin or lactoglobulin.

The concentration of the functional protein in the aqueous dispersion may vary with the type of product required and the purity or functionality of the protein, but is preferably in the range of 2–25% by weight of the dispersion. Most commonly, the protein concentration will be in the range of 4–15% but for gels produced from purified proteins may be as low as 2%, while for crude, less active protein materials may be as high as 25%.

The reducing sugar may be any sugar capable of entering into a Maillard reaction. Examples include lactose, xylose and glucose. For commercial applications it may be desirable to use crude source of reducing sugar such as whey powder rather than expensive purified sugars such as lactose. Nevertheless, certain purified sugars such as xylose are effective at such low concentrations that they may be economically competitive in commercial applications.

The reducing sugar concentration is preferably in the range of 1–6% by weight of the aqueous dispersion but for purified materials may be as low as 0.3% and for crude sugar sources may be as high as 10% by weight.

The protein denaturant employed may be selected from a range of chaotropic denaturants such as sodium dodecyl sulphate, guanidinium hydrochloride and the like. A range of protein denaturing conditions is also available such as adjustment of pH, of ionic strength, application of heat and application of pressure. These conditions and denaturant agents may be used singly or in combination. A protein denaturant modulator such as simple salts eg. potassium chloride, sodium chloride or sodium citrate, may also be employed to effect modulation of the degree of denaturation caused by the protein denaturant and/or the denaturing conditions. Clearly, any additive used for this purpose must be acceptable in the intended product.

Where alkalinity is used to achieve denaturing conditions, the aqueous dispersion will be converted into a substantially clear, thermally reversible gel at a rate dependent upon the temperature of the dispersion, the concentrations of the protein and reducing sugar reactants, and conditions such as pH value. At high concentrations of the reactants, the gel will form at room temperature over a number of hours, whereas with average concentrations heating may be necessary. For example a temperature of, say, 80° C. may suffice, but other elevated temperatures including pasteurization or sterilization temperatures are effective.

During the course of the reaction the pH of the aqueous dispersion may be observed to fall so that where the initial pH of the mixture is, for example, about 12, the pH of the final gel product will usually be in the neutral range, say pH 6–8. This permits its use in food applications where highly alkaline products would be unacceptable. For food uses it is preferred to raise the alkalinity of the dispersion to an initial pH 10–13, preferably by the addition of potassium hydroxide, although other monovalent alkaline hydroxides and salts can be used.

It will be frequently found, particularly with the cruder protein forms, that reducing the strength of the ionic environment of the protein leads to an easier denaturation of the protein under the influence of a denaturant and/or denaturing conditions. For example, removal of salt from the proteins employed can reduce the alkaline pH value needed to achieve a stable, clear gel and, in some cases, the heat employed in processing may then suffice without pH adjustment.

However, in some situations, particularly but not necessarily with the purer protein forms, the protein molecules may already under mild denaturing conditions be in a very substantially denatured form. In this situation the addition of a certain amount of a protein denaturing modulator e.g. sodium chloride, may be necessary to reduce the charges on the protein molecules to reduce the distention of the molecules so that on addition of a reducing sugar easier crosslinking may occur, leading to a heat stable transparent protein gel network. Thus under some denaturing conditions certain proteins may fail to gel until a certain level of salt strength has been incorporated prior to crosslinking. At higher levels of sodium chloride further repression of denaturation occurs prior to crosslinking and weaker, poorer gels may be obtained.

Whilst not wishing to be bound by the following hypothesis the inventors believe that the invention involves denaturing the protein so as to unfold the molecules by applying a denaturant and/or denaturing conditions. The application of a reducing sugar then results in the formation of crosslinks between the protein molecules leading to a transparent, heat stable, thermo-irreversible gel, when optionally the denaturing conditions may be removed. This cross linking, before protein aggregation occurs, gives rise to clear, heat stable gels and avoids the otherwise formation of opaque aggregated protein gels.

Important among the applications of this invention is the production of food products in which particles or pieces of edible material are embedded in a gel medium, especially commercially food products such as meat-in-jelly canned products. In the preparation of such products it may be convenient to use the normal heat sterilisation procedure to induce the conversion of the aqueous dispersion into the required gel.

By virtue of the clarity of the gel, the typical surface appearance of pieces of meat embedded in the gel is apparent upon visual inspection of the product. More particularly, it is preferred that the clarity of the gel should be such that the surface appearance of meat remains visible when coated with a layer of the gel 2.5 mm in thickness. The glossy character of the gel is also of advantage in a meat-in-Jelly product, glossiness in this context referring to the lustre of the gel surface, which may be considered as exhibiting a relatively high level of specular reflectance.

Another use of the thermally irreversible gels of this invention is in the production of discrete pieces or chunks of edible material for inclusion in a canned product, serving for example as a binder for nutritive ingredients. Such pieces can be formed by conventional techniques and pass unchanged through retorting processes.

The aqueous dispersion of the reactants for a gel of this invention has good emulsifying properties, mud this permits the emulsification of added oils or fats before the reaction to form the gel product. This enables stable, low calorie spreads to be produced.

Another group of applications of this invention employs the gel as a heat-resistant substitute for gelatine, for example in products for use in high temperature climates and in the preparation of hallal food products.

Sheets of the gel can be produced, for example, by spreading the aqueous dispersion on a temporary support before formation of the gel. Such sheets can be dried to form clear protein films with a variety of uses. The flexibility of such films can be enhanced by incorporating a plasticizer such as glycerol in the initial dispersion.

Formation of a protein film in situ can be used to provide an edible coating on a variety of food products. For example if a coating of the aqueous dispersion is applied to fruit or vegetables and allowed to gel before being dried, an edible protective barrier is provided on the foodstuff. Other products on which similar coatings may be useful include chocolate bars or materials which are normally sticky to the touch or dangerous to handle. Such a film coating can also be used as a fat barrier layer during the frying of potato chips or as a barrier to migration of moisture into pastry in, for example, custard tarts.

The following are examples of the practice of this invention:

EXAMPLE 1

1 KS frozen blood plasma 30 g whey powder

The plasma is thawed and the whey powder added and mixed thoroughly. The pH is adjusted to 12 by the dropwise addition of 30% w/v aqueous solution of potassium hydroxide and the mixture heated to 125° C. for 10 minutes. A clear, bright, glossy brown gel of pH 7 is produced.

EXAMPLE 2

The same ingredients are used as in Example 1. The alkaline mixture is combined with meats or meat analogues in a can, and processed at 129° C. for 1 hour. The product consists of cooked meats in a glossy, clear, brown gel, at pH 7.

EXAMPLE 3

1 KS frozen blood plasma 35 g whey powder 0.1 ml lactase

The same method as Example 1 is used, except that the enzyme is added to the plasma and whey, to break down the lactose into the more readily reactive glucose and galactose, and the mixture is incubated at room temperature for 2 hours prior to pH adjustment.

EXAMPLE 4

10 g of dried plasma powder mid 1 g of xylose, glucose or lactose are added to 100 g of water. The mixture is dispersed using a high shear homogeniser. The pH of the mixture is adjusted to pH 12 with KOH or NaOH. The mixture is divided into 20 ml aliquots in screw capped vials and the samples are autoclaved at 125° C. for 15 minutes. The product is a glossy, clear, dark brown gel of pH 6.5–7.5.

EXAMPLE 5

Samples of gel prepared in accordance with Example 4 were placed in a freezer at −18° C. for 1 hour. The frozen samples were allowed to thaw at room temperature. The samples were essentially the same before and after freezing. This demonstrates that gels according to this invention can exhibit freeze-thaw stability.

EXAMPLE 6

A clear gel is formed as in Examples 1, 3 or 4 optionally containing dispersed edible material such as meat slurry, is divided into pieces and added as an ingredient to a raw meat mixture. This is canned and conventionally sterilised to produce a cooked meat product containing pieces of gel which have remained clear, glossy and thermo-irreversible.

EXAMPLE 7

15 g plasma powder and 2 g xylose are added to 100 ml of water together with 1.3 g of sodium tripolyphosphate (STPP) and 0.2 g sunflower oil. The mixture is homogenised using a high shear mixer. The pH of the mixture is adjusted to 12 with KOH. The mixture is allowed to stand at room temperature for 4 hours or more, by which time the product has set to form a light brown jelly. The product can be canned and autoclaved at 129° C. for 1 hour, producing a substantially clear gel. The gel phase itself retains its clarity, although this may be reduced slightly by virtue of the suspended oil or fat.

EXAMPLE 8

An aqueous suspension of 10% plasma powder, 2.5% xylose and 2.5% sodium dodecyl sulphate (SDS) is heated to 125° C. for 10 minutes. A clear red/brown heat irreversible gel is formed.

EXAMPLE 9

The following example demonstrates the effectiveness of pH modification in achieving the objects of this invention. It also illustrates the use of light transmission to estimate the degree of clarity or transparency of gels.

An aqueous suspension of 10% plasma powder and 2% lactose was divided into two aliquots. One portion was adjusted to pH 12 with 1M sodium hydroxide, the other remained at pH 8. Each was added to a 1 mm cuvettes via a syringe and heated to 121° C. for 2 minutes.

The mixture without pH modification gave an opaque, heat irreversible gel which transmitted less than 1% of light in the 400 to 800 nm region.

The mixture adjusted to pH 12 gave a clear heat stable gel with up to 70% transmittance of light in the 400 to 800 nm region.

EXAMPLE 10

100 ml of whole citrated blood is mixed with 3 g of glucose and the pH adjusted to 12 with 1M NaOH. It is heated to 125° C. for 15 minutes to produce a robust dark brown glossy gel.

EXAMPLE 11

15 g whole blood powder and 3 g lactose are dispersed in 100 ml of water, and the pH adjusted to 12 with 1M KOH. The mixture is heated to 130° C. for 5 minutes to yield a robust dark brown glossy gel.

EXAMPLE 12

100 g of minced white fish offal is homogenised with 3 g of galactose, and the pH of the mixture adjusted to 11.5 with 1M NaOH. This is heated to 125° C. for 15 minutes to produce a heat irreversible clear brown gel containing pieces of white fish.

EXAMPLE 13

The procedure of Example 4 is repeated with 9 g of egg albumin powder replacing the dried plasma. A similar gel is obtained.

EXAMPLE 14

A 10% solution of dried and powdered egg albumen is prepared in distilled water. The solution is dialysed in distilled water for 24 hours. The solution is centrifuged at 1400 rpm in a Beckman J21C centrifuge (JA-14 rotor) for 15 minutes. The supernatant is retained for use. The solution has a pH of approx. 6.6.

0.5% xylose is added to the solution, which is then processed for 30 minutes at 90° C. and then cooled. The solution is then retorted at 125° C. for 15 minutes. The end product is a firm, elastic and clear orange gel with a pH of approximately 6.4.

EXAMPLE 15

A 10% solution of an ultrafiltered and dried porcine plasma preparation is made up in distilled water. 0.5% xylose is added to the solution, and portions of this mixture are adjusted to pH 10.2, pH 10.9 and pH 12.0. Different levels of sodium chloride are then added to portions of the pH-adjusted aliquots. The samples are retorted at 125° C. for 15 minutes.

At pH 10.2 a clear brown gel is formed. At pH 10.9, a clear gel is formed at 30 mM salt. At pH 12.0 a clear liquid is formed at 30 mM salt, a clear gel at 150 mM and a soft translucent jelly at 500 mM.

We claim:

1. A proteinaceous product comprising a thermally irreversible and stable, substantially clear gel formed by the reaction product of globular protein and reducing sugar.

2. A proteinaceous product according to claim 1 wherein said gel contains from 2 to 25% globular protein by weight.

3. A proteinaceous product according to claim 1 which comprises particles or pieces of edible material embedded in the gel.

4. A proteinaceous product according to claim 1 in which the gel is divided into pieces and incorporated as an ingredient in a food product.

5. A proteinaceous product according to claim 1 in which oil or fat is dispersed in the gel.

6. A proteinaceous product according to claim 1 which is commercially sterile but remains substantially clear.

7. A proteinaceous product comprising a thermally irreversible and stable, substantially clear gel formed by the reaction product of globular protein and reducing sugar, said product being in the form of a protein film obtained by drying said gel.

8. A proteinaceous product according to claim 7 in which the protein film constitutes an edible coating or barrier layer on a foodstuff or other product.

9. A process for producing a proteinaceous gel comprising the steps of:

preparing an aqueous dispersion of a globular protein or of proteinaceous material containing such protein;

incorporating a reducing sugar or source thereof in said dispersion in a concentration of from 0.3–10% by weight of the dispersion;

subjecting said protein in said dispersion to denaturing conditions;

maintaining said denaturing conditions while causing said sugar to react with said protein; and causing said protein in said dispersion under denaturing conditions to form a gel structure and thereby to produce a thermally irreversible and stable substantially clear gel product.

10. A process according to claim 9 in which the gel structure comprises from 2–25% gel-forming protein by weight.

11. A process according to claim 9 in which the reducing sugar is lactose, xylose or glucose or a source thereof.

12. A process according to claim 9 wherein the denaturing conditions include applying an alkaline denaturing agent.

13. A process according to claim 12 wherein said denaturing conditions comprise an alkaline pH value between 10 and 13.

14. A process according to claim 9 in which the salt content of the protein or proteinaceous material is reduced prior to gel formation.

15. A process according to claim 9 in which particles or pieces of edible material are mixed with the aqueous dispersion prior to formation of the gel.

16. A process according to claim 9 in which the gel is divided into pieces and incorporated in a food product.

17. A process according to claim 15 in which the aqueous dispersion containing the protein and reducing sugar reactants and said edible material is subjected to pasteurizing or sterilizing conditions.

18. A process according to claim 9 in which oil or fat is emulsified in the aqueous dispersion prior to formation of the gel.

19. A process according to claim 9 in which the aqueous dispersion containing the protein and reducing sugar reactants is spread on a temporary support and dried to form a protein film.

20. A process according to claim 19 in which a plasticizer is incorporated with the aqueous dispersion.

21. A process according to claim 9 in which the aqueous dispersion containing the protein and reducing sugar reactants is coated on a foodstuff or other product and dried thereon to constitute a coating or barrier layer.

22. In the process of producing a thermally irreversible gel from a globular protein or proteinaceous material containing such protein, comprising the steps of:
   preparing an aqueous dispersion of said protein or proteinaceous material; and
   causing said protein in said dispersion to form a thermally irreversible gel structure;
   the improvement comprising:
   incorporating a reducing sugar or source thereof in said dispersion in a concentration of from 0.3 to 10% by weight of the dispersion;
   subjecting said protein in said dispersion to denaturing conditions;
   and maintaining said denaturing conditions while causing said reducing sugar to react with said protein and causing said protein to form a thermally irreversible gel structure, thereby yielding a stable substantially clear gel product.

23. The improvement of claim 22 wherein said denaturing conditions comprise an alkaline pH value between 10 and 13.

24. The improvement of claim 22 wherein the reaction of said sugar with said protein and the formation of said gel structure are brought about by maintaining said dispersion at a temperature of at least about 80° C.

25. The improvement of claim 24 wherein said dispersion is raised to a pasteurization or sterilization temperature.

26. The improvement of claim 22 wherein said dispersion contains from 2 to 25 weight percent protein.

27. The improvement of claim 22 in which oil or fat is emulsified in the aqueous dispersion prior to formation of the gel.

28. The improvement of claim 22 in which the aqueous dispersion containing the protein and reducing sugar reactants is spread on a temporary support and dried to form a protein film.

29. The improvement of claim 28 in which a plasticizer is incorporated with the aqueous dispersion.

30. The improvement of claim 22 in which the aqueous dispersion containing the protein and reducing sugar reactants is coated on a foodstuff or other product and dried thereon to constitute a coating or barrier layer.

31. A process for producing a proteinaceous gel comprising the steps of:
   preparing an aqueous dispersion of a globular protein or of proteinaceous material containing such protein;
   incorporating a reducing sugar or source thereof in said dispersion;
   applying a chaotropic agent to said protein in said dispersion to denature said protein;
   causing said sugar to react with said protein in the presence of said chaotropic agent; and
   causing said protein in the presence of said sugar and said chaotropic agent to form a gel structure and thereby produce a thermally irreversible and stable substantially clear gel product.

32. The process of claim 31 wherein the chaotropic agent is selected from the group consisting of sodium dodecyl sulphate and guanidinium hydrochloride.

33. A process according to claim 31 in which oil or fat is emulsified in the aqueous dispersion prior to formation of the gel.

34. A process according to claim 31 in which the aqueous dispersion containing the protein and reducing sugar reactants is spread on a temporary support and dried to form a protein film.

35. A process according to claim 34 in which a plasticizer is incorporated with the aqueous dispersion.

36. A process according to claim 31 in which the aqueous dispersion containing the protein and reducing sugar reactants is coated on a foodstuff or other product and dried thereon to constitute a coating or barrier layer.

* * * * *